Figure 1:
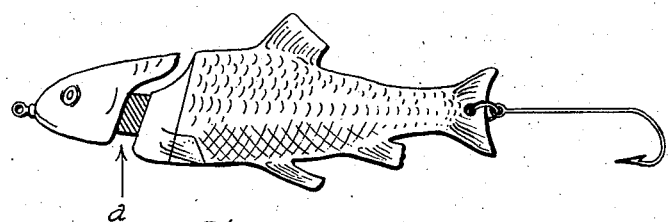

Nov. 24, 1942.  J. R. TOWNSEND ET AL  2,303,097
LUMINOUS ARTIFICIAL BAIT
Filed Sept. 28, 1939  3 Sheets-Sheet 1

Nov. 24, 1942.   J. R. TOWNSEND ET AL   2,303,097
LUMINOUS ARTIFICIAL BAIT
Filed Sept. 28, 1939   3 Sheets-Sheet 2

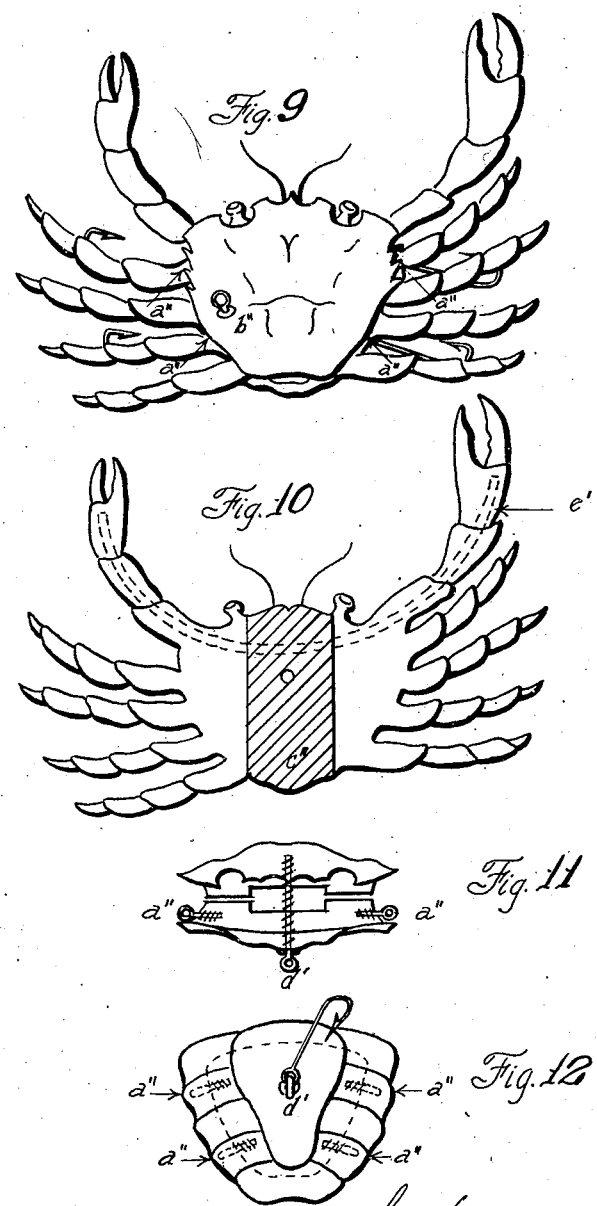

Patented Nov. 24, 1942

2,303,097

UNITED STATES PATENT OFFICE 2,303,097

LUMINOUS ARTIFICIAL BAIT

John R. Townsend, Essex Fells, and Lars Gaston de Lagerberg, Montclair, N. J.

Application September 28, 1939, Serial No. 296,920

1 Claim. (Cl. 43—44)

The following is a description of a new form of artificial bait.

A great number of artificial baits have been made resembling in various degrees natural bait. With these artificial baits, there has been a certain appeal to form and color as in the original or natural baits.

Many of the natural baits have luminous color or luminescence. For example, shrimp show phosphorescence as well as squid. Undoubtedly, this is a means by which fish see these baits at night and at depths in the water. At any rate, the fish will be attracted by the luminescent color of the artificial bait to be described hereinafter.

Artificial baits have been made with batteries and electric lights in the body of the artificial lure which causes the body to glow. In these baits the body is made of cellulose acetate or other translucent plastic material which is caused to glow by the use of the electric light. They may be made of any translucent or semi-translucent material to gain the desired effect. Such baits have had some success even though there has not been much resemblance to the natural bait supposed to be imitated. The principal defects are that the batteries must be replaced and there is danger of short circuiting it due to water leaking into the bait, as well as breakage of the filament in the globe due to shock.

It is well known that the more natural an artificial lure appears the better it is for the purpose. Most artificial baits are simplified in order that they may be easily manufactured and hence, not too costly. The light or luminescence, therefore, has the effect of providing another form of attraction for fish.

In the bait to be hereinafter described there is no sacrifice in the natural physical appearance of the bait and the luminosity still further carries out the deception that the bait is like its prototype. The bait is then more nearly similar in many respects to its natural prototype and the degree of intensity of its glow can be controlled to further attract the attention of the quarry. These are the desired objectives of a successful bait. These are believed to be new and novel features never used before in the design of fishing tackle or artificial bait.

There are three features of this bait that are important and these are as follows:

1. The bait is luminous since incorporated in its body is luminescent or phosphorescent material that reradiates light after having been exposed to light or artificial light. It is well known that the salts of zinc and sulphur, calcium and sulphur and the like will glow after having been exposed to sunlight or artificial light. Some of these salts will glow as long as an hour after having been first radiated with light. The radiation is usually of longer wavelength than the light first impinging on the salt. Therefore, ultra violet light is used as the inciter of this secondary light. It is not necessary, however, that the material be first incited by ultra violet light. We have found that ordinary diffuse daylight which contains no ultra violet light is very effective in causing luminescence of zinc and calcium and similar compounds. It is possible also to incite this continuing luminosity by the original exposure to the light of an incandescent lamp.

2. The body of the bait has a translucence similar to the natural bait when viewed through the medium of water.

3. The bait is molded from plastic material in a mold or die so that the external appearance of the bait is an excellent resemblance to its prototype.

This luminosity can be rendered permanent by the addition of radium salts to form a radium paint that will radiate light practically permanently. It is not, however, necessary to use radium salts or paint since luminosity for a half hour or so is sufficient for practical fishing use where the bait will be removed from the water from time to time and hence, will be re-activated by daylight, or in the case of night fishing by exposure to an electric flash light. In this a few of the dangers of radium use will be avoided as well as the expense of this material.

The luminous material as described above is incorporated in the molding compound. We have done this by mixing the commercial molding powder with the luminous powder or salt and molding the composite powder under heat and pressure in the usual way. Methyl methracalate, polystyrene, cellulose acetate, urea formaldehyde and phenol formaldehyde are some of the materials that have been incorporated together with the luminous powder to form the luminous plastic compound.

There is no restriction to the kinds of bait that can be made by the process of molding described above. The bait can be made in sections and assembled with springs and other members to give a living and life-like appearance in the water.

Figure 2:
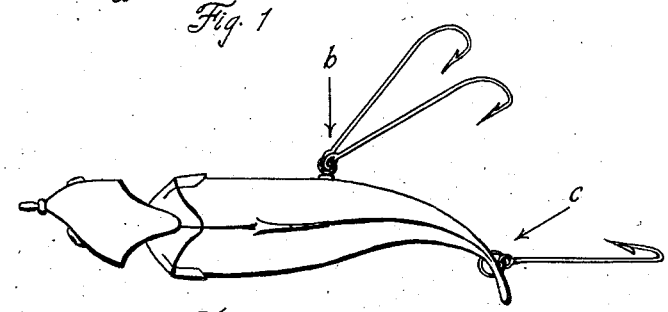
Figure 3:
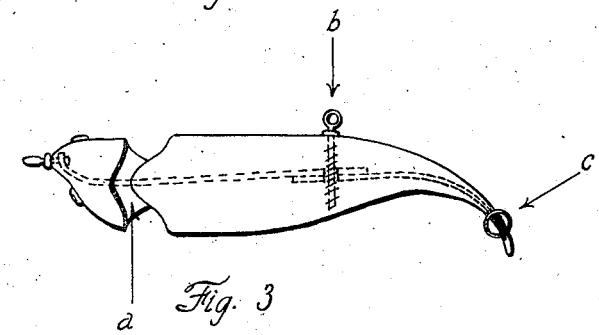
Figure 4:
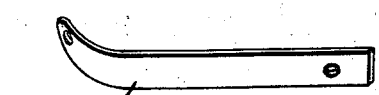

Figs. 1, 2 and 3 show a luminous minnow bait. Fig. 4 shows the plate. Figs. 5 to 8, inclusive, show a luminous crawfish bait. Figs. 9 to 12, inclusive, show a luminous crab bait.

In the form shown in Figs. 1, 2 and 3, the head is joined to the body by a plate fulcrum spring a permitting the curved body of luminous plastic material herein before described to wobble or flick to and fro as it is drawn against the volume of the water which thus actuates through alternation of pressure the lifelike swimming action of the bait. The body-tail portion of the bait may be either one moulding pierced for the the spring or two separate molds to be fixed together on either side of the spring a as shown on Figure 3, which is one method among other convenient methods which may be used in fabrication.

Figures 5 to 8, inclusive show the typical shrimp or cray fish type luminous bait.

Figure 5:
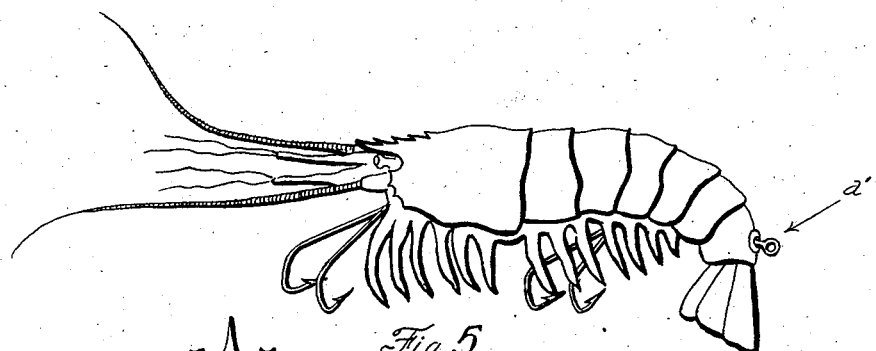
Figures 6, 8:
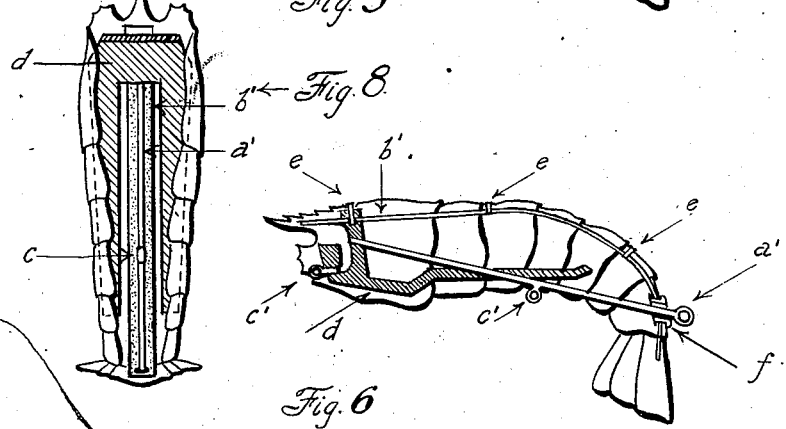

Figure 5 is a general side view of the assembled bait. Figure 6 shows the section of the body from the same side, as if the shrimp were cut vertically from the center of head to center of tail along the back.

Figure 7:
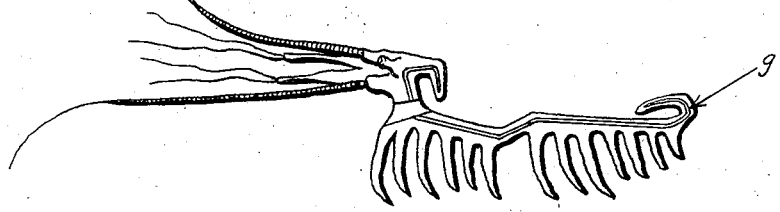

A method of constructing this bait is for the body to be cast from luminous flexible plastic which is then attached as at points e in Figure 6 to spring b' which forms the backbone of a metal casting d. The rod a' is firmly bedded in the casting d and passes through a free opening in the spring b' as shown at point f. If the bait is then jerked by means of a line attached to the rod a', the pressure of the water against the tail of the bait causes the tail to flex towards the head; springing back along the rod to its original position on the relaxing of tension. This is one way of giving a lifelike action to the bait. Figure 7 shows a section similar in cut to Figure 6 in which the head and feet are separately molded of flexible or pliable waterproof material imbedding a spring g which acts as a skeleton for the soft portion of the body and permits it to be clamped by said spring over the front and rear portions of the casting d shown in Figure 6. Figure 4 depicts the bottom view of Figure 6. The points c' in the various figures are the positions at which the hooks may be attached. This is a method by which shrimp or cray-fish type bait may be constructed, but other methods can be used.

Figures 9 to 12, inclusive depict a general crab form luminous bait. Figure 9 shows a top view with off-set swivel-eye for line attachment shown at b'' and points at which hooks are attached indicated at a'' to eyelets hidden from above. Figure 10 shows the luminous eyed head and the legs molded in one piece of a pliable waterproof material in which a metal brace is embedded to stiffen the claws as indicated by e' and a raised keyblock is shown as in the shaded section c'' which prevents this form from slipping when sandwiched between upper and lower segments of Figure 11. Figure 11 is a front view of the upper and lower sections of the shell showing space in center for keying in Figure 10, the entire bait being thus assembled and held together by eyed screw d'' where bottom hook is attached. Side hooks are placed as at a'' in Figure 11 which corresponds to positions a marked in Figure 9 where eyelets are not seen, and bottom view as shown in Figure 12. Such is one of several means of constructing the crab form luminous bait.

The following claim is made:

A fish lure having the body substantially composed of commercial molding powder and luminous powder, the composite structure being developed by heat and pressure.

JOHN R. TOWNSEND.
LARS GASTON de LAGERBERG.